United States Patent
Irish et al.

(10) Patent No.: US 7,431,261 B2
(45) Date of Patent: Oct. 7, 2008

(54) PNEUMATIC SUSPENSION APPARATUS FOR A VEHICLE SEAT

(76) Inventors: Sean Kyle Irish, 31314 Quicksilver La., Acton, CA (US) 95310; Nicholas Edwin Audino, 622 W. Main St., Lebanon, TN (US) 37087

( * ) Notice: Subject to any disclaimer, the term of this patent is extended or adjusted under 35 U.S.C. 154(b) by 417 days.

(21) Appl. No.: 11/204,498

(22) Filed: Aug. 16, 2005

(65) Prior Publication Data
US 2005/0269847 A1   Dec. 8, 2005

Related U.S. Application Data

(63) Continuation-in-part of application No. 10/682,063, filed on Oct. 8, 2003, now abandoned.

(51) Int. Cl.
*F16M 13/00* (2006.01)
(52) U.S. Cl. .................. 248/566; 248/631; 248/638; 180/89.13; 267/64.27
(58) Field of Classification Search .......... 248/566, 248/550, 638, 631; 180/89.13; 267/64.27, 267/140.14, 64.16, 64.19
See application file for complete search history.

(56) References Cited

U.S. PATENT DOCUMENTS

| | | | |
|---|---|---|---|
| 3,059,918 A * | 10/1962 | Pribonic | 267/64.16 |
| 3,682,431 A | 8/1972 | Vivian | |
| 3,736,020 A | 5/1973 | Pilachowski et al. | |
| 4,198,025 A | 4/1980 | Lowe et al. | |
| 4,563,038 A | 1/1986 | Hirose | |
| 4,589,620 A * | 5/1986 | Sakamoto | 248/550 |
| 4,681,292 A | 7/1987 | Thomas | |
| 5,004,206 A * | 4/1991 | Anderson | 248/585 |
| 5,570,866 A * | 11/1996 | Stephens | 248/631 |
| 5,634,685 A | 6/1997 | Herring | |
| 5,725,066 A * | 3/1998 | Beard et al. | 180/89.12 |
| 5,810,125 A * | 9/1998 | Gezari | 188/266.2 |
| 6,029,764 A * | 2/2000 | Schubert | 180/89.13 |
| 6,193,005 B1 | 2/2001 | Jurrens | |
| 6,746,004 B2 * | 6/2004 | Leonard et al. | 267/64.27 |
| 6,886,650 B2 * | 5/2005 | Bremner | 180/89.13 |

OTHER PUBLICATIONS

Greg Friend, Paul Cox's Rigidaire Suspension for Hardtails, Street Chopper Magazine, Nov. 2004, pp. 34, 35, 36, 38, 39.

* cited by examiner

*Primary Examiner*—Anita M King
(74) *Attorney, Agent, or Firm*—James Addison Barry, Jr.

(57) ABSTRACT

The pneumatic suspension apparatus 3 includes at least one pneumatic bag 4 for being attached with a vehicle between the vehicle frame and the vehicle seat for restricting the vehicle seat laterally and dampening vibrations; a regulator 6 pneumatically connected with the at least one pneumatic bag 4, where the regulator 6 adjusts the pressure in the at least one pneumatic bag 4; and a reservoir 8 pneumatically connected with the regulator 6. Optionally, a compressor 9 may be included to pressurize the reservoir 8. The compressor 9 may replace the reservoir 8 in supplying pressure to the pneumatic bag 4.

10 Claims, 5 Drawing Sheets

PNEUMATIC SUSPENSION APPARATUS FOR A VEHICLE SEAT

CROSS-REFERENCE

The present application is a Continuation-In-Part of the parent U.S. patent application Ser. No. 10/682,063, filed Oct. 8, 2003 now abandoned, titled Pneumatic Suspension Apparatus for a Vehicle Seat, currently pending. The present application is related by the same inventors for both applications, Sean Kyle Irish and Nicholas Edwin Audino. The parent application U.S. patent application Ser. No. 10/682,063, filed Oct. 8, 2003 is hereby incorporated in its entirety by reference.

TECHNICAL FIELD

The present invention is related to the field of vehicle seating. More specifically, this disclosure presents a pneumatic suspension apparatus to improve the comfort of vehicle seating while reducing fatigue.

BACKGROUND

Often people spend a great deal of time seated each day on seats with little or no suspension. As a result the person must endure a great deal of physical discomfort, and each seating can contribute to fatigue. Each seating can vibrate the back or other parts of the body. Seat designers have attempted to design seats in many different ways to improve comfort and decrease fatigue. One of many areas where this is applicable is motorcycles. The typical motorcycle ride lasts for several hours, and very often several days covering hundreds of miles. The rider is subject to physical discomfort and fatigue. Motorcycle comfort has improved dramatically in recent years, and now many features are available which keep riders comfortable during long-distance rides. Modern advanced suspension systems have assisted in this regard, resulting in a smooth, improved ride during prolonged trips.

Most motorcycles incorporating extensive suspension systems, termed "soft tail" motorcycles, vary in appearance from motorcycles without suspension systems, known as "hard tail" motorcycles. Hard tail motorcycles offer a more rugged body look but have no provision for adding comfort to the rider. Many motorcycle enthusiasts desire the look of a hard tail motorcycle coupled with the comfort benefits of a suspension system. The present invention provides a means for adapting a vehicle seat into a more comfortable riding vehicle through the attachment of a pneumatic suspension apparatus beneath the seat.

Information relevant to attempts to address these problems can be found in U.S. Pat. Nos. 4,681,292; 6,193,005; 3,736,020; 4,563,038; and 5,634,685. However, each one of these references suffers from one or more of the following disadvantages: suspension systems using shock absorbers, springs, or air bags must be built into the frame or chassis which distracts from the rugged look and is also expensive; shock absorbers with height adjustment mechanisms are inserted between the frame and the seat, which are complicated and expensive; or inflatable/deflatable seat cushions are built into the seat cushion or attached to the top surface of the seat, which are limited in reducing the fatigue.

A need exists in the art to offer a simple, comfortable vehicle seat with reduced rider fatigue. Therefore, it would be desirable to provide a means for adapting a vehicle seat to be comfortable, allowing the rider to enjoy reduced fatigue. This is especially applicable for motorcycle enthusiasts who would like the look of a hard tail motorcycle, with a more rugged body look, coupled with the comfort benefits of a pneumatic suspension apparatus for adding comfort to the rider.

SUMMARY OF THE INVENTION

It is a primary aspect of this invention to provide a pneumatic suspension apparatus to improve the comfort of vehicle seating while reducing fatigue. In addition, the pneumatic suspension apparatus provides a means for adapting a hard tail motorcycle into a more comfortable riding vehicle through the attachment of a pneumatic suspension apparatus beneath the seat.

This invention in one embodiment comprises a pneumatic suspension apparatus which dampens the vibrations between a vehicle frame and a vehicle seat. The pneumatic suspension apparatus comprises at least one pneumatic bag for being attached with a vehicle between the vehicle frame and the vehicle seat wherein the at least one pneumatic bag essentially restricts the vehicle seat laterally and dampens the vibrations between the vehicle frame and the vehicle seat; a bag pneumatic line, comprising a first end of the bag pneumatic line and a second end of the bag pneumatic line, with the first end of the bag pneumatic line pneumatically connected with the pneumatic bag; a regulator pneumatically connected with the second end of the bag pneumatic line wherein the regulator adjusts the pneumatic pressure of the at least one pneumatic bag; a reservoir pneumatic line, comprising a first end of the reservoir pneumatic line and a second end of the reservoir pneumatic line, with the first end of the reservoir pneumatic line pneumatically connected with the pneumatic bag; and a reservoir pneumatically connected with the second end of the reservoir pneumatic line wherein the reservoir supplies inflation of the at least one pneumatic bag.

Another embodiment may further include a compressor; and a compressor pneumatic line. The compressor pneumatic line includes a first end of the compressor pneumatic line and a second end of the compressor pneumatic line. The first end of the compressor pneumatic line is pneumatically connected with the compressor and the second end of the compressor pneumatic line is pneumatically connected with the reservoir. The compressor pressurizes the reservoir.

In yet another embodiment, the present invention may further comprise an upper mounting plate for being attached with a vehicle between the vehicle seat and the at least one pneumatic bag; and a lower mounting plate for being attached between the at least pneumatic bag and the vehicle frame.

Still another embodiment may include a pneumatic suspension apparatus wherein the upper mounting plate is for being conventionally attached with the vehicle seat with fasteners, the upper mounting plate is further attached with the pneumatic bag by means of a threaded rod in the upper portion of the pneumatic bag that extends through an aperture in the upper mounting plate, and an upper nut is tightened to secure the pneumatic bag with the upper mounting plate. The lower mounting plate is attached with the pneumatic bag by means of a threaded tube in the lower portion of the pneumatic bag passing through an aperture in the lower mounting plate, a lower nut below the lower mounting plate is tightened to firmly secure the pneumatic bag with the lower mounting plate, and the lower mounting plate is for being attached to the vehicle frame. The first end of the bag pneumatic line is pneumatically connected with the threaded tube.

Another embodiment of the present invention comprises a pneumatic suspension apparatus which dampens the vibrations between a vehicle frame and a vehicle seat. The pneumatic suspension apparatus comprising: at least one pneumatic bag for being attached with a vehicle between the vehicle frame and the vehicle seat wherein the at least one pneumatic bag essentially restricts the vehicle seat laterally and dampens the vibrations between the vehicle frame and the vehicle seat; a bag pneumatic line, comprising a first end of the bag pneumatic line and a second end of the bag pneumatic line, with the first end of the bag pneumatic line pneumatically connected with the pneumatic bag; a regulator pneumatically connected with the second end of the bag pneumatic line wherein the regulator adjusts the pneumatic pressure of the at least one pneumatic bag; a compressor pneumatic line, comprising a first end of the compressor pneumatic line and a second end of the compressor pneumatic line, with the first end of the compressor pneumatic line pneumatically connected with the pneumatic bag; and a compressor pneumatically connected with the second end of the compressor pneumatic line wherein the compressor supplies inflation of the at least one pneumatic bag.

BRIEF DESCRIPTION OF THE DRAWINGS

These and other features, aspects, and advantages of the invention will become better understood with regard to the following description, appended claims, and accompanying drawings where:

DETAILED DESCRIPTION

The present invention relates to the field of vehicle seating. More specifically, this disclosure presents a pneumatic suspension apparatus to improve the comfort of vehicle seating while reducing fatigue. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The present invention is useful for improving the comfort of vehicle seating while reducing fatigue by using a pneumatic suspension apparatus. There are many applications for this invention such as providing a comfortable riding seat on a variety of vehicles. Vehicles could include, but are not limited to motorcycles, lawn tractors, boats, fork lift trucks, soap box racers, and all terrain vehicles. One application of the present invention includes adapting a hard tail motorcycle into a more comfortable riding vehicle through the attachment of the pneumatic suspension apparatus beneath the seat.

Figure 1:
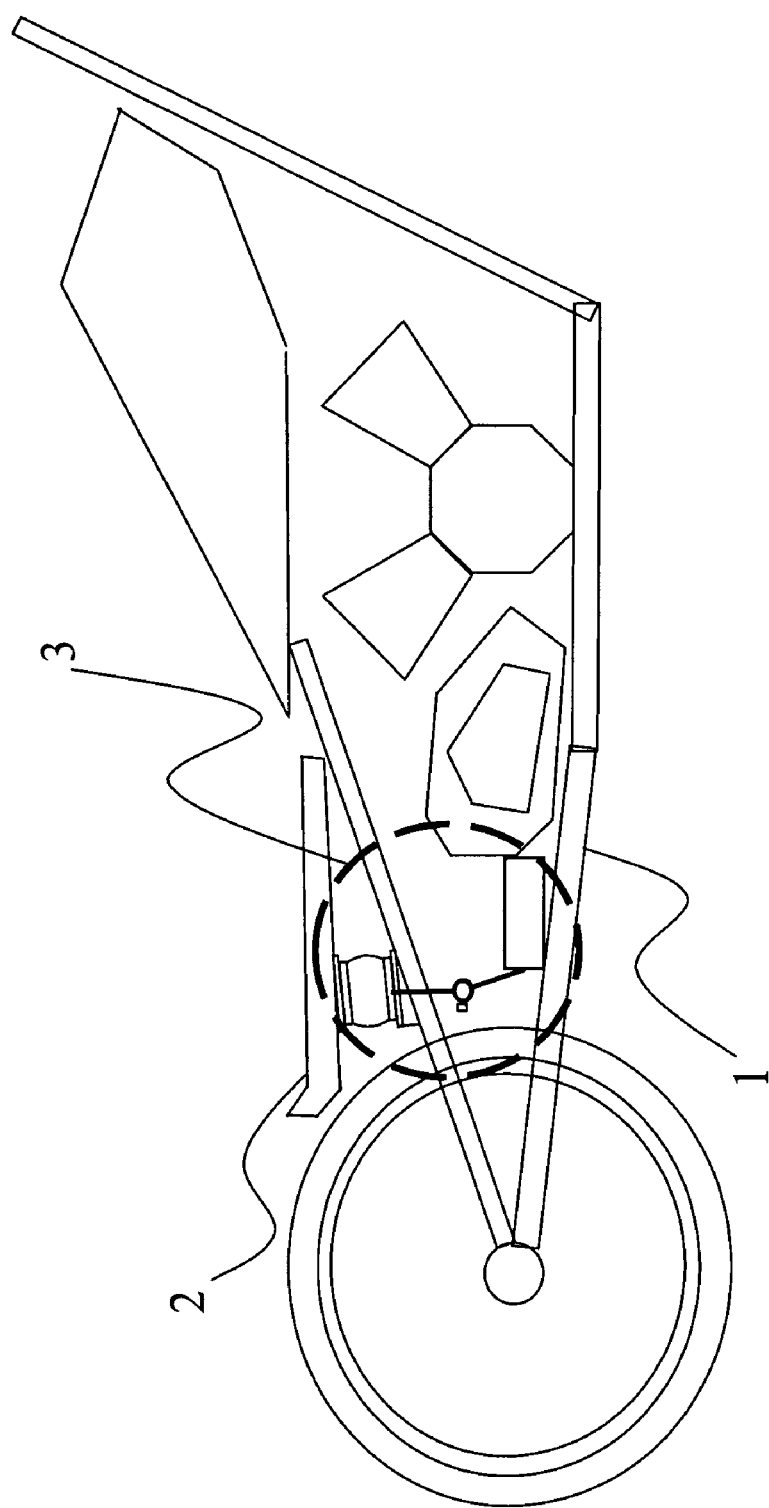
FIG. 1 depicts a pneumatic suspension apparatus according to the present invention where the pneumatic suspension apparatus is for being attached with a hard tail motorcycle.

Referring now to the drawings wherein like reference numerals designate identical or corresponding parts throughout the several views, an overview of one embodiment of the invention is shown in FIG. 1. A vehicle frame 1 that is depicted is attached directly with a vehicle axle. The vehicle frame 1 does not have a suspension system. There are no shock absorbers or springs to dampen the road vibrations. Therefore, the rider or the passenger's body absorbs the road vibrations. In this configuration, normally a vehicle seat 2 is mounted directly on the vehicle frame 1. However, the present invention inserts a pneumatic suspension apparatus 3 between the vehicle frame 1 and the vehicle seat 2. Pneumatic is defined for the present invention as compression of a compressible gas that includes but is not limited to air, nitrogen, and carbon dioxide. The pneumatic suspension apparatus 3 dampens the road vibrations transferred between the vehicle frame 1 and the vehicle seat 2, thus reducing the physical discomfort.

Figure 2:
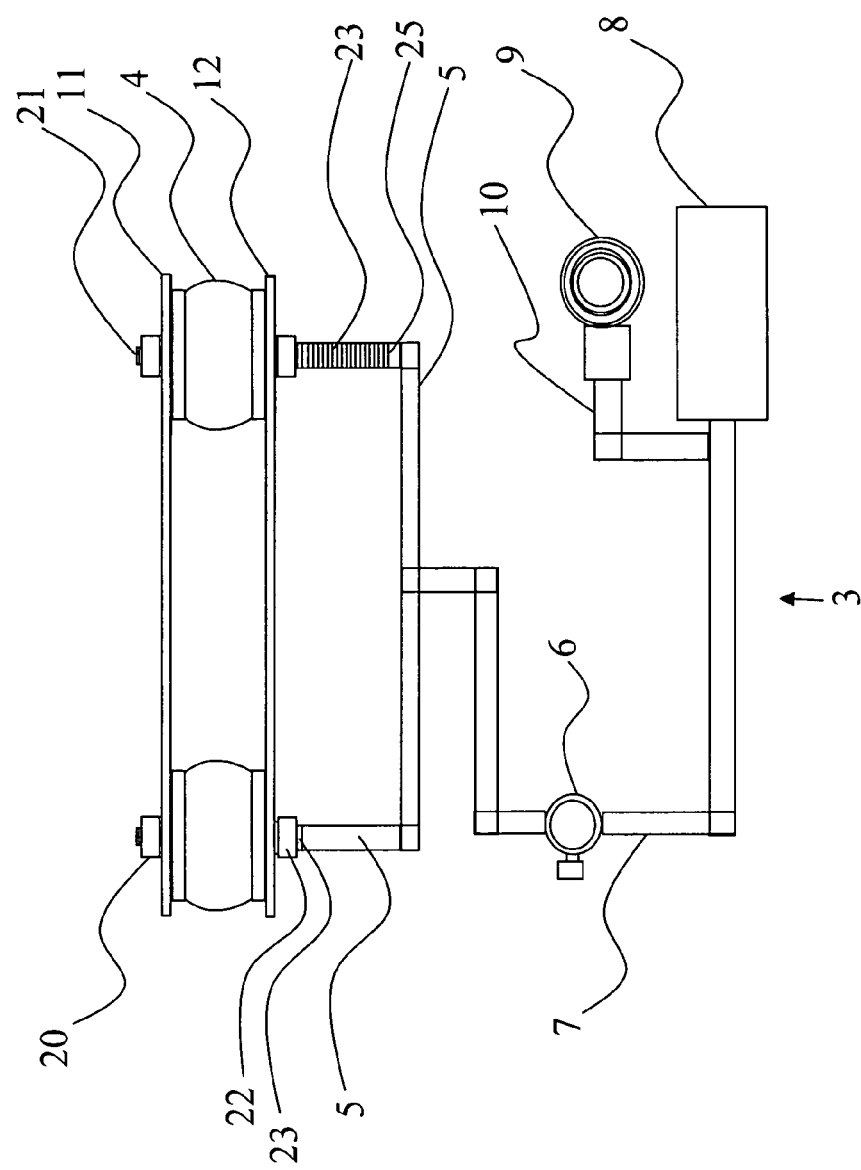
FIG. 2 is a detailed view of one embodiment of the pneumatic suspension apparatus of the present invention.

Another embodiment of the present invention is shown in FIG. 2. The pneumatic suspension apparatus 3 comprises at least one pneumatic bag 4 for being attached with a vehicle between the vehicle frame 1 and the vehicle seat 2. FIG. 2 depicts a dual pneumatic bag installation. However, the number of pneumatic bags 4 may vary depending on the application. The pneumatic bag 4 essentially restricts the vehicle seat laterally and dampens the vibrations between the vehicle frame 1 and the vehicle seat 2. The pneumatic bag 4 is short and therefore allows very little side play. The small amount side play that remains is not critical for the type of vehicles using this application such as motorcycles, lawn tractors, boats, fork lift trucks, soap box racers, and all terrain vehicles. For this type of application, there is more of a need for the pneumatic bag to be free floating, not eliminating all of the movement but reducing most of the movement especially to remove as much of the vibration as possible. The pneumatic bag 4 may be a standard air bellows or a custom air bellows. The pneumatic bag 4 has many advantages over shock absorber or fluid cylinders used in vehicles in the past. For example, the pneumatic pressure in the pneumatic bags 4 can be adjusted while the vehicle is on the move. If the pneumatic pressure within the pneumatic bag 4 is increased, the ride will be stiffer. If the pneumatic pressure within the pneumatic bag 4 is decreased, the ride will be softer. Shock absorbers have inherent friction and drag problems which reduce the responsiveness of the piston and shaft within the shock absorber to rapid directional changes. Because the pneumatic bags 4 do not have a shaft and piston arrangement, there is no inherent drag or friction and therefore the responsiveness of the pneumatic bags 4 to rapid directional changes is much quicker. A bag pneumatic line 5 is pneumatically connected between the pneumatic bag 4 and a regulator 6. Pneumatically connected is the connection of one end of a pneumatic line, which can be an air hose or air line, connected with a pneumatic bag, regulator, reservoir, or compressor, wherein the connection can withstand the operating pressure between the pneumatic line and the pneumatic bag, regulator, reservoir, or compressor. The bag pneumatic line 5 includes a first end of the bag pneumatic line 5 and a second end of the bag pneumatic line 5, with the first end of the bag pneumatic line 5 pneumatically connected 25 with the pneumatic bag 4. The second end of the bag pneumatic line 5 is pneumatically connected with the regulator 6. The first end of the bag pneumatic line 5 may tee off to pneumatically connect additional pneumatic bags 4 when there are more than one pneumatic bag 4 used in the application. The bag pneumatic line 5 is a standard air line or air hose that can withstand the operating pressure between the pneumatic bag 4 and the regulator 6 for the particular application. The regulator 6 adjusts the pneumatic pressure of the pneumatic bag 4. The regulator 6 has a conventional means for selecting the adjustment of the pneumatic pressure for the pneumatic bag 4 typically this is an adjustable knob. A reservoir pneumatic line 7 is connected between the regulator 6 and a reservoir 8. The reservoir pneumatic line 7 includes a first end of the reservoir pneumatic line 7 and a second end of the reservoir pneumatic line 7. The first end of the reservoir pneumatic line 7 is pneumatically connected with the regulator 6. The second end of the reservoir pneumatic line 7 is pneumatically connected with the reservoir 8. The reservoir pneumatic line 7 is an air line or air hose that can withstand the operating pressure between the regulator 6 and the reservoir 8 for the particular application. The reservoir 8 is used to pressurize the pneumatic bag 4.

Another embodiment of the present invention further comprises a compressor 9 and a compressor pneumatic line 10 that is pneumatically connected between the compressor 9 and the reservoir 8. The compressor pneumatic line 10 includes a first end of the compressor pneumatic line 10 and a second end of the compressor pneumatic line 10. The first end of the compressor pneumatic line 10 is pneumatically connected with the compressor 9. The second end of the compressor pneumatic line 10 is pneumatically connected with the reservoir 8. The compressor 9 is used to pressurize the reservoir 8. Optionally, the compressor 9 may be used in place of the reservoir 8 in desired applications. The wiring and the voltage for the compressor 9 are conventional depending on the application.

Yet another embodiment of the present invention further includes an upper mounting plate 11 for being attached with a vehicle between the vehicle seat 2 and the pneumatic bag 4 and a lower mounting plate 12 for being attached between the pneumatic bag 4 and the vehicle frame 1.

Another embodiment of the present invention is depicted in FIG. 2 wherein the upper mounting plate 11 is for being conventionally attached with the vehicle seat 2 with fasteners that include but are not limited to rivets, bolts, or screws. The upper mounting plate 11 is further attached with the pneumatic bag 4 by means of a threaded rod 21 in the upper portion of the pneumatic bag 4 that extends through an aperture in the upper mounting plate 11 and is tightened with an upper nut 20 to secure the pneumatic bag 4 with the upper mounting plate 11. The lower mounting plate 12 is attached with the pneumatic bag 4 by means of a threaded tube 23 in the lower portion of the pneumatic bag 4 passing through an aperture in the lower mounting plate 12. A lower nut 22 below the lower mounting plate 12 is tightened to firmly secure the pneumatic bag 4 with the lower mounting plate 12. The lower mounting plate 12 is for being fastened with the vehicle frame 1. The first end of the bag pneumatic line 5 is pneumatically connected 25 with the threaded tube 23 outside and below the pneumatic bag. This embodiment can be a bolt-on kit with all the necessary parts for the application such as a "hard tail" motorcycle, tractor or bass boat application.

Figure 3:
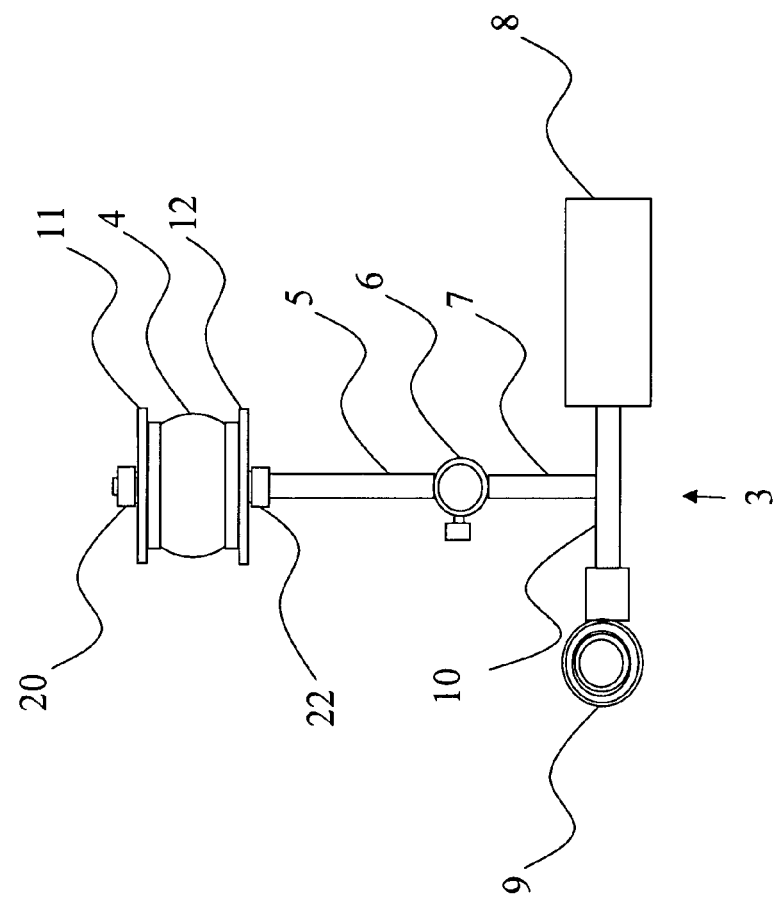
FIG. 3 is a detailed view of another embodiment of the pneumatic suspension apparatus of the present invention depicting a single pneumatic bag installation.

FIG. 3 depicts a single pneumatic bag 4 installation. This particular embodiment comprises the pneumatic bag 4 and the regulator 6. The bag pneumatic line 5 is pneumatically connected between the pneumatic bag 4 and the regulator 6. The reservoir 8 is pneumatically connected with the regulator 6. The reservoir pneumatic line 7 is pneumatically connected between the regulator 6 and the reservoir 8. An option for this embodiment and other embodiments further comprises a compressor 9 pneumatically connected with the reservoir 8. A compressor pneumatic line 10 is pneumatically connected between the compressor 9 and the reservoir 8. Another option for this embodiment and other embodiments further comprises the upper mounting plate 11 for being attached with a vehicle between the vehicle seat 2 and the pneumatic bag 4 and the lower mounting plate 12 is for being attached with a vehicle between the pneumatic bag 4 and the vehicle frame 1.

Figure 4:
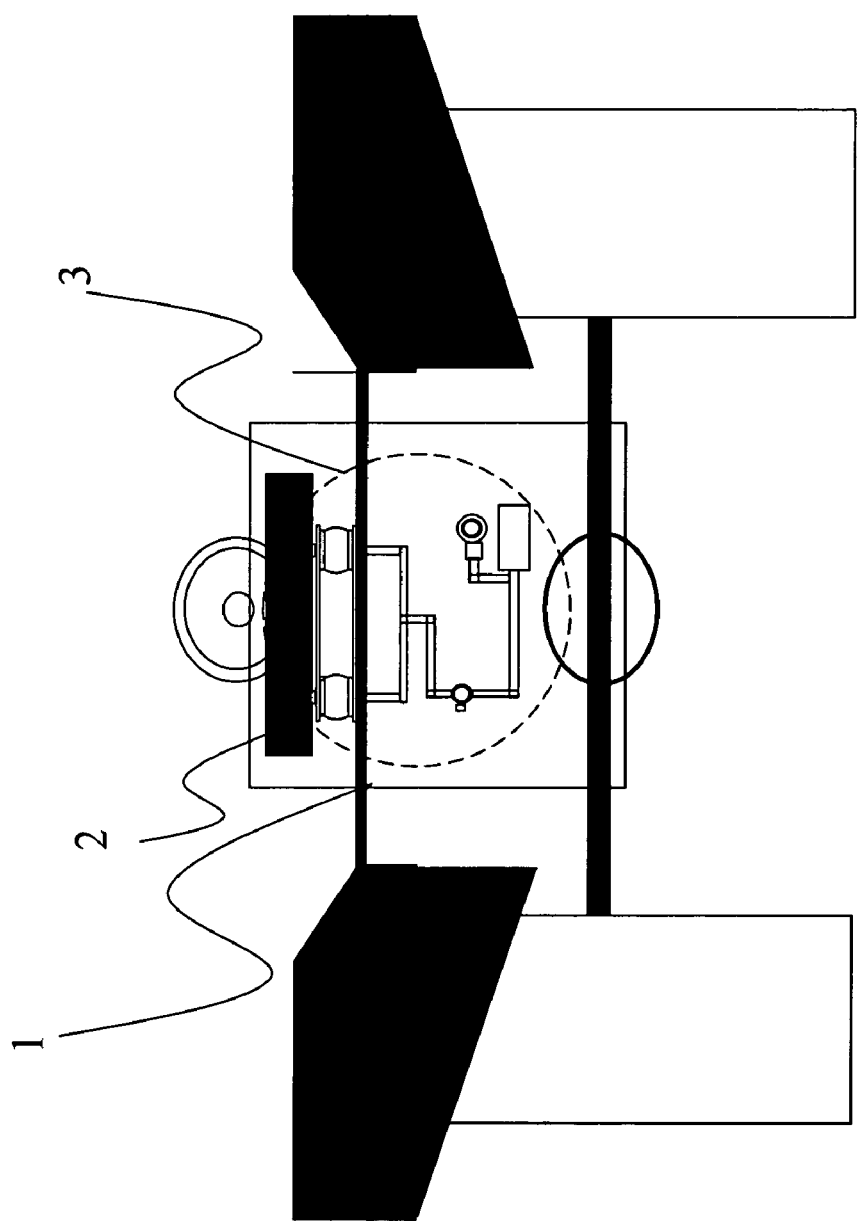
FIG. 4 depicts a pneumatic suspension apparatus according to the present invention where the pneumatic suspension apparatus is for being attached with a tractor.
Figure 5:
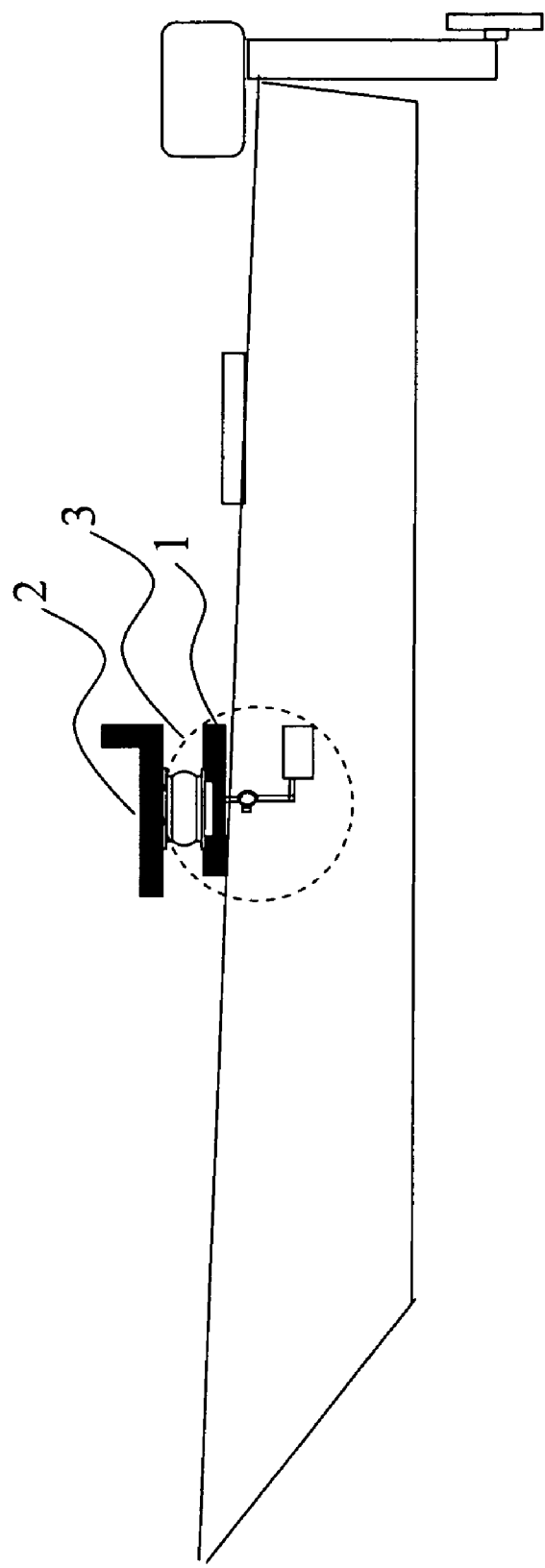
FIG. 5 depicts a pneumatic suspension apparatus according to the present invention where the pneumatic suspension apparatus is for being attached with a boat.

FIG. 4 depicts a pneumatic suspension apparatus 3 according to the present invention where the pneumatic suspension apparatus 3 is for being attached with a tractor. The pneumatic suspension apparatus 3 is attached between the vehicle frame 1 and the vehicle seat 2 as previously described. FIG. 5 depicts a pneumatic suspension apparatus according to the present invention where the pneumatic suspension apparatus is for being attached with a boat. The pneumatic suspension apparatus 3 is also attached between the vehicle frame 1 and the vehicle seat 2 as previously described.

What is claimed is:

1. A pneumatic suspension apparatus which dampens the vibrations in combination with a vehicle, the pneumatic suspension apparatus comprising:
   at least one pneumatic bag attached with the vehicle between a vehicle frame and a vehicle seat wherein the at least one pneumatic bag essentially restricts the vehicle seat laterally and dampens the vibrations between the vehicle frame and the vehicle seat;
   a bag pneumatic line, comprising a first end of the bag pneumatic line and a second end of the bag pneumatic line, with the first end of the bag pneumatic line pneumatically connected with the pneumatic bag;
   a regulator pneumatically connected with the second end of the bag pneumatic line wherein the regulator adjusts the pneumatic pressure of the at least one pneumatic bag wherein a change in the pneumatic pressure adjusts the ride;
   a reservoir pneumatic line, comprising a first end of the reservoir pneumatic line and a second end of the reservoir pneumatic line, with the first end of the reservoir pneumatic line pneumatically connected with the pneumatic bag; and
   a reservoir pneumatically connected with the second end of the reservoir pneumatic line wherein the reservoir supplies inflation of the at least one pneumatic bag.

2. The pneumatic suspension apparatus as set forth in claim 1 further comprising:
   a compressor; and
   a compressor pneumatic line further comprising a first end of the compressor pneumatic line and a second end of the compressor pneumatic line wherein the first end of the compressor pneumatic line is pneumatically connected with the compressor and the second end of the compressor pneumatic line is pneumatically connected with the reservoir wherein the compressor pressurizes the reservoir.

3. The pneumatic suspension apparatus as set forth in claim 1 further comprising:
   an upper mounting plate attached between the vehicle seat and the at least one pneumatic bag; and
   a lower mounting plate attached between the at least pneumatic bag and the vehicle frame.

4. The pneumatic suspension apparatus as set forth in claim 1 wherein the vehicle is a motorcycle.

5. The pneumatic suspension apparatus as set forth in claim 4 wherein the motorcycle is a hard tail motorcycle.

6. The pneumatic suspension apparatus as set forth in claim 1 wherein the vehicle is a boat.

7. The pneumatic suspension apparatus as set forth in claim 1 wherein the vehicle is a tractor.

8. The pneumatic suspension apparatus as set forth in claim 7 wherein the vehicle is a lawn tractor.

9. The pneumatic suspension apparatus as set forth in claim 1 wherein the vehicle is a vehicle selected from the group consisting of fork lift trucks, soap box racers, and all terrain vehicles.

10. A pneumatic suspension apparatus which dampens the vibrations, the pneumatic suspension apparatus comprising:
- at least one pneumatic bag for being attached with a vehicle between a vehicle frame and a vehicle seat wherein the at least one pneumatic bag essentially restricts the vehicle seat laterally and dampens the vibrations between the vehicle frame and the vehicle seat;
- a bag pneumatic line, comprising a first end of the bag pneumatic line and a second end of the bag pneumatic line, with the first end of the bag pneumatic line pneumatically connected with the pneumatic bag;
- a regulator pneumatically connected with the second end of the bag pneumatic line wherein the regulator adjusts the pneumatic pressure of the at least one pneumatic bag;
- a reservoir pneumatic line, comprising a first end of the reservoir pneumatic line and a second end of the reservoir pneumatic line, with the first end of the reservoir pneumatic line pneumatically connected with the pneumatic bag;
- a reservoir pneumatically connected with the second end of the reservoir pneumatic line wherein the reservoir supplies inflation of the at least one pneumatic bag;
- an upper mounting plate for being attached with a the vehicle between the vehicle seat and the at least one pneumatic bag;
- a lower mounting plate for being attached between the at least pneumatic bag and the vehicle frame;
- the upper mounting plate is for being conventionally attached with the vehicle seat with fasteners, the upper mounting plate is further attached with the pneumatic bag by means of a threaded rod in the upper portion of the pneumatic bag that extends through an aperture in the upper mounting plate, and an upper nut is tightened to secure the pneumatic bag with the upper mounting plate;
- the lower mounting plate is attached with the pneumatic bag by means of a threaded tube in the lower portion of the pneumatic bag passing through an aperture in the lower mounting plate, a lower nut below the lower mounting plate is tightened to firmly secure the pneumatic bag with the lower mounting plate, and the lower mounting plate is for being attached to the vehicle frame; and
- the first end of the bag pneumatic line is pneumatically connected with the threaded tube outside and below the pneumatic bag.

* * * * *